US009560444B2

(12) United States Patent
Niedzwiedz et al.

(10) Patent No.: US 9,560,444 B2
(45) Date of Patent: Jan. 31, 2017

(54) KINETIC EVENT DETECTION IN MICROPHONES

(71) Applicant: Cisco Technology, Inc., San Jose, CA (US)

(72) Inventors: Christopher Allen Niedzwiedz, Austin, TX (US); Christopher Blayne Dreier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 13/800,444

(22) Filed: Mar. 13, 2013

(65) Prior Publication Data
US 2014/0270275 A1  Sep. 18, 2014

(51) Int. Cl.
H04R 3/00 (2006.01)
H04R 3/02 (2006.01)
H04M 1/60 (2006.01)
H04R 1/04 (2006.01)
H04R 1/08 (2006.01)

(52) U.S. Cl.
CPC ............... *H04R 3/002* (2013.01); *H04M 1/60* (2013.01); *H04R 1/04* (2013.01); *H04R 3/007* (2013.01); *H04R 3/02* (2013.01); *H04M 2250/12* (2013.01); *H04R 1/083* (2013.01); *H04R 2430/01* (2013.01)

(58) Field of Classification Search
CPC ....... H04R 1/1041; H04R 1/1083; H04R 3/00; H04R 3/002; H04R 3/007; H04R 3/04; H04R 25/30; H04R 25/305; H04R 2225/41; H04R 2225/43; H04R 2225/61; H04R 2420/07; H04R 1/04; H04R 3/02; H04R 2430/01; H04M 2250/12; H04M 1/60; H04M 1/6016; H04M 1/605; G06F 1/1694; G06F 3/0346; G06F 3/012; G06F 11/3058; G06F 2200/1637
USPC .......... 381/56–58, 94.1–94.9, 107, 312, 315, 381/317, 320, 321; 330/149; 73/514.01
See application file for complete search history.

(56) References Cited

U.S. PATENT DOCUMENTS

| 6,031,922 | A  | * | 2/2000 | Tibbetts ......................... 381/313 |
| 6,330,339 | B1 | * | 12/2001 | Ishige et al. .................. 381/312 |
| 6,928,170 | B1 | * | 8/2005 | Statham .......................... 381/92 |
| 7,775,964 | B2 | * | 8/2010 | Miller, III ........................ 600/25 |

(Continued)

FOREIGN PATENT DOCUMENTS

| CN | 101212734 A | * | 7/2008 | .............. H04M 1/02 |
| CN | 102655541 A | * | 9/2012 | .............. H04M 1/60 |

(Continued)

*Primary Examiner* — Curtis Kuntz
*Assistant Examiner* — Joshua Kaufman
(74) *Attorney, Agent, or Firm* — Lempia Summerfield Katz LLC

(57) ABSTRACT

In one implementation, the output of a microphone is modified based on movement. A circuit or other controller is in communication with a microphone that generates an electrical signal based on sounds waves and a motion sensor. The motion sensor may be coupled to the microphone, coupled to a device including the microphone, or coupled to an object in the vicinity of the microphone. The controller is configured to receive the electrical signal from the microphone and motion data from the motion sensor. The controller is configured to perform a comparison of the motion data to a threshold level and adjust the electrical signal in response to the comparison of the motion data to a threshold acceleration level.

17 Claims, 8 Drawing Sheets

(56) References Cited

U.S. PATENT DOCUMENTS

| | | | |
|---|---|---|---|
| 8,170,871 B2* | 5/2012 | Myburg et al. | 704/226 |
| 8,265,306 B2 | 9/2012 | Frey | |
| 8,531,414 B2* | 9/2013 | Huibers | 345/173 |
| 8,641,595 B2* | 2/2014 | Basinger | 600/25 |
| 2006/0155346 A1* | 7/2006 | Miller, III | 607/57 |
| 2009/0089053 A1* | 4/2009 | Wang et al. | 704/233 |
| 2009/0097683 A1* | 4/2009 | Burns et al. | 381/324 |
| 2009/0187065 A1* | 7/2009 | Basinger | 600/25 |
| 2009/0235192 A1* | 9/2009 | De Haan | G06F 1/1626 |
| | | | 715/764 |
| 2009/0257608 A1* | 10/2009 | Chew et al. | 381/312 |
| 2009/0287485 A1* | 11/2009 | Glebe | G10L 21/0208 |
| | | | 704/233 |
| 2010/0278365 A1* | 11/2010 | Biundo Lotito et al. | 381/315 |
| 2011/0187652 A1* | 8/2011 | Huibers | 345/173 |
| 2012/0033821 A1* | 2/2012 | Ohta et al. | 381/71.1 |
| 2012/0128167 A1* | 5/2012 | Tanaka | 381/58 |
| 2012/0275630 A1* | 11/2012 | Hannemann et al. | 381/320 |
| 2012/0278070 A1* | 11/2012 | Herve et al. | 704/226 |
| 2012/0280824 A1* | 11/2012 | Zelepugas | 340/670 |
| 2012/0288106 A1* | 11/2012 | Bizjak | 381/57 |
| 2013/0195295 A1* | 8/2013 | van Halteren et al. | 381/312 |
| 2013/0202132 A1* | 8/2013 | Zurek et al. | 381/107 |
| 2013/0230180 A1* | 9/2013 | Thormundsson et al. | 381/56 |
| 2015/0309767 A1* | 10/2015 | Osoinach | G06F 3/165 |
| | | | 340/4.42 |

FOREIGN PATENT DOCUMENTS

| | | | | |
|---|---|---|---|---|
| CN | 103152465 A * | 6/2013 | | H04M 1/60 |
| WO | WO 2011157856 A2 * | 12/2011 | | H04R 1/04 |

\* cited by examiner

KINETIC EVENT DETECTION IN MICROPHONES

TECHNICAL FIELD

This disclosure relates in general to the field of kinetic event detection, and more specifically, to kinetic event detection from accelerometers in microphones.

BACKGROUND

Microphones convert sound waves to electrical signals. A microphone is used in audio recordings. In one example, a video teleconference, a microphone generates electrical signals in one video teleconferencing room for transmission to another video teleconferencing room. Audio quality is dependent on the positioning of the microphone within the room, the acoustics of the room, the characteristics of the microphone, and any unwanted sounds near the microphone.

The movement of the microphones may cause unwanted sounds. One unwanted sound is the bump, thump, or scraping sound that results from the microphone being moved, bumped, or slid across a table. Software techniques may be used to remove background noise and other interference. However, the noises caused by movement of the microphone may be too significant for software techniques.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a method includes converting sound to an electrical signal at a microphone, receiving acceleration data based on motion of the microphone or a device in a vicinity of the microphone, performing a comparison of the acceleration data to a threshold acceleration level, and adjusting the electrical signal in response to the comparison of the acceleration data to a threshold acceleration level.

In another embodiment, an apparatus includes a motion sensor, an audio circuit, and a motion circuit. The motion sensor is configured to generate motion data based on movements of the apparatus. The audio circuit configured to convert sounds to an output signal. The motion circuit configured to receive the motion data and modify the output signal based on a comparison of the motion data to a threshold.

Example Embodiments

Microphones are included in devices that records sounds. A microphone includes an acoustic-to-electric transducer or sensor that converts sound waves to electrical impulses or signals. Microphones are used in live presentations to collect sound and send the resulting electrical signals to an amplifier and/or speakers. Microphones are used in telephones to convert collected sounds to electrical signals and send the electrical signals to another party. The unwanted noise caused from bumping or otherwise moving the telephone or microphone is also collected and transmitted to the other party. The following embodiments detect the bumping and reduce the unwanted noise based on the detection. The reduction may involve decreasing the volume or magnitude of the electrical signals, blocking the electrical signals, or otherwise diminishing the disruption caused by the bumping or moving of the microphone.

Figure 1:
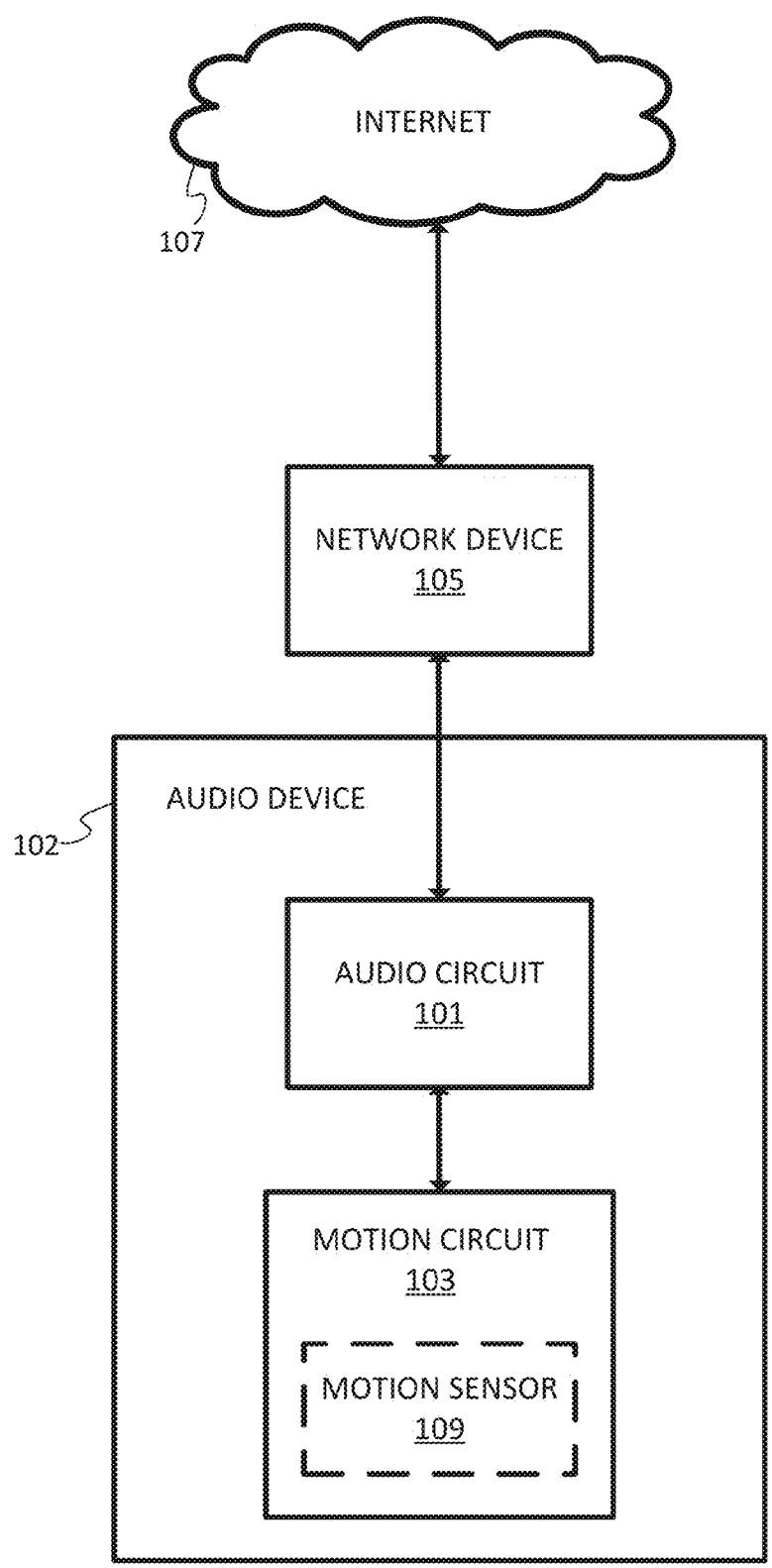
FIG. 1 illustrates an example system for recording and transmitting audio.

FIG. 1 illustrates an example system for recording and transmitting audio. The system includes an audio circuit 101 and a motion circuit 103, which includes a motion sensor 109. The audio circuit 101 may be part of an audio device 102 (e.g., a telephone). The audio device 102 may be a voice over internet protocol (VoIP) device, which is a network device configured to communicate on a network. Example audio devices include the Cisco 7900 family of telephones, the Cisco CP-9971, and the Cisco CP-9951. Alternatively, the network device 105 may connect the audio device 102 to a network, such as the Internet 107. The network device 105 may be a router, gateway, data switch, or another device.

The motion sensor 109 of the motion circuit 103 is configured to detect movement of the audio device 102. The motion sensor 109 may be an accelerometer or a gyroscope. The motion sensor 109 may output position data or acceleration data indicative of movements of the audio device 102. The accelerometer may be single-axis or multi-axis. The accelerometer may output orientation data. The accelerometer may include a damped mass coupled to a spring. In response to an acceleration force placed on the accelerometer, the mass is displaced so that the spring accelerates the mass at the same rate as the casing. The physical displacement is measured to generate the acceleration data. The motion sensor 109 may output position data or acceleration data indicative of movements of an object in the vicinity of the audio device 102. The objects that are physically coupled to the audio device 102 or not physically coupled but near enough to create sounds audible by the audio device 102 are collectively referred to as objects in the vicinity of the audio device 102.

The accelerometer may be a piezoelectric device, a piezoresistive device, or a capacitive device to convert the mechanical motion into an electrical signal. The accelerometer may be a micro electro-mechanical system (MEMS) and may include a cantilever beam with a seismic mass in gas sealed in the device. Alternatively, the motion sensor 109 may be a magnetometer and generate orientation data as motion data. The motion sensor 109 may be an inertial measurement unit (IMU) including any integrated combination of accelerometers, gyroscopes, and magnetometers. Other motions sensors may be used.

The motion sensor 109 is physically connected to the microphone. The motion sensor 109 may be embedded in the microphone or otherwise secured to the microphone. The motion sensor 109 and the motion circuit 103 may be enclosed in a module that connects to the microphone. An input of the module connects to a microphone cable and an output of the module connects to the microphone.

The audio circuit 101 is configured to convert sound to an electrical signal. The audio circuit 101 may include a microphone or another electric transducer or sensor that converts sound waves to electrical impulses or signals. The sound waves may include desired audio and unwanted audio. The unwanted audio may include sounds caused from movement of the audio device 102. The sounds may be caused from bumping or sliding the audio device 102 on another object such as a table. The sounds may be caused by adjusting a flexible microphone stand.

The motion circuit 103 is in electrical communication with the sensor 109 and with the audio circuit 101. The motion circuit 103 receives acceleration or other motion data from the sensor 109 based on motion of the audio device 102 physically coupled to the microphone. The motion circuit 103 is configured to perform a comparison of the acceleration data to a threshold acceleration level. The threshold acceleration level may be configurable or static and set by the motion circuit 103.

The motion circuit 103 changes the operation of the audio circuit 101 in response to the comparison of the acceleration data to a threshold acceleration level. The change may adjust a volume level of the output of the audio circuit 101, block the output of the audio circuit 101, or filter the output of the audio circuit 101. Accordingly, when the motion of the audio device 102 reaches a specified level, the output of the audio circuit 101 is modified.

Blocking the output of the audio circuit 101 may include an interruption of the electrical signals from the microphone. The electrical signals may be blocked by introducing an open circuit on the output of the microphone. The electrical signals may be blocked by grounding the output of the microphone.

Adjusting the volume level of the output of the audio circuit 101 may include attenuating the electrical signals from the microphone. The attenuation may be added using an amplifier circuit including a variable resistor, a variable operational amplifier, or a transistor. The attenuation reduces the volume of the output of the audio signal 101. The reduction may be a predetermined proportion of the output of the audio signal 101 or by a predetermined amount.

Filtering the volume level of the output of the audio circuit 101 may include removing portions of the electrical signals from the microphone. For example, electrical signal components below a specific cutoff frequency may be considered vibrations and removed or reduced using a high pass filter. The high pass filter may include a capacitor with capacitance (C) in series with the output of the audio circuit 101 and a resistor with resistance (R) between the output of the audio circuit 101 and ground. The cutoff frequency may be defined by $1/(2\pi RC)$. Example cutoff frequencies include 20 hertz, 50 hertz, 100 hertz, or another value.

Figure 2:
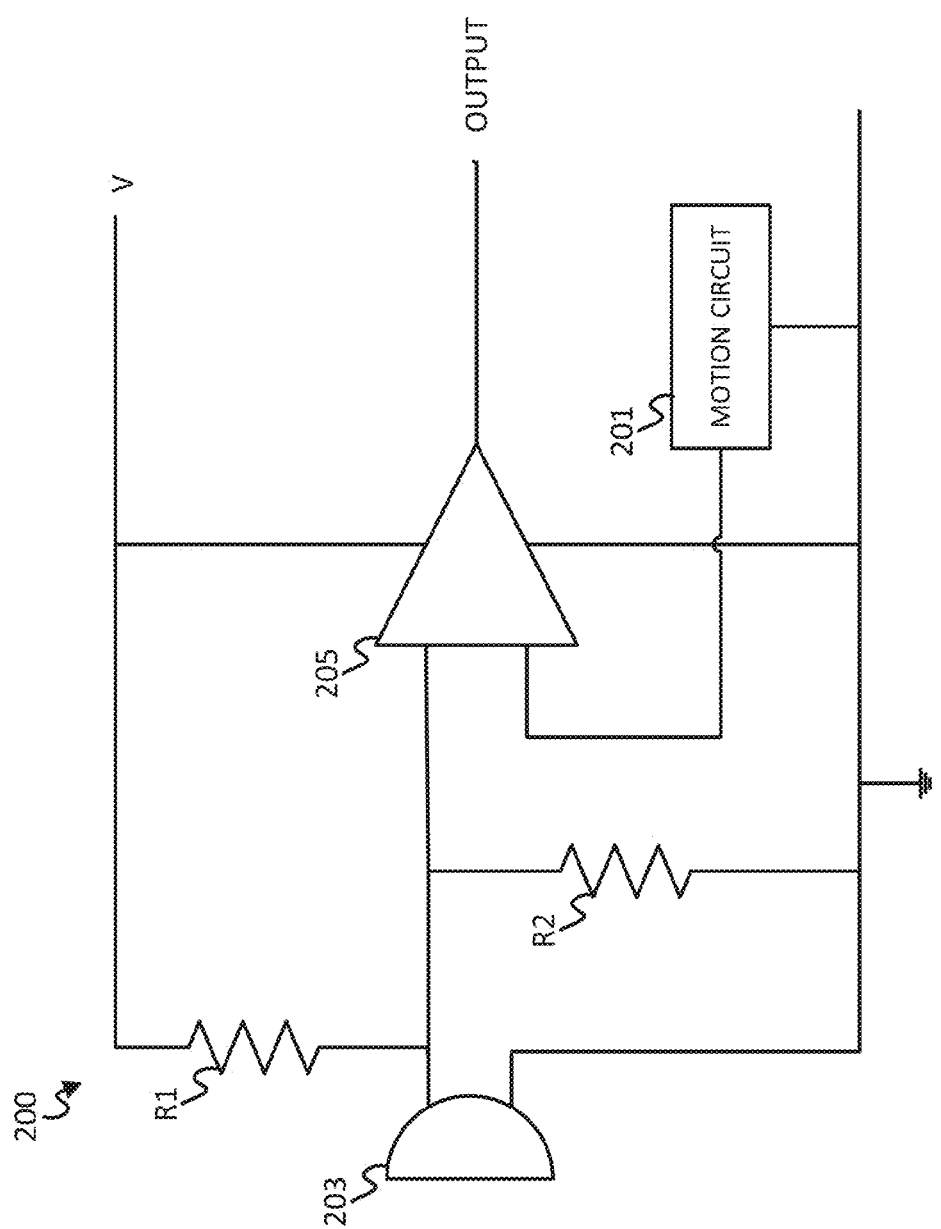
FIG. 2 illustrates an example circuit for kinetic event detection.

FIG. 2 illustrates an example circuit for kinetic event detection. The circuit of FIG. 2 includes an audio circuit 200 and a motion circuit 201. The audio circuit includes an amplifier 205, a microphone 203, and a resistor network including resistors R1 and R2. The resistors R1 and R2 may be selected to control the gain of the amplifier 205. For example, the gain of the amplifier 205 may be R1/R2.

The motion circuit 201 includes the motion sensor 109. The motion circuit 201 compares data derived from the output of the motion sensor to at least one threshold. The motion circuit 201 may act as a switch. When the output of the motion sensor is above a threshold, the motion circuit 201 acts as an open circuit, which turns off the amplifier 205. When the output of the motion sensor is below the threshold, the motion circuit 201 connects the amplifier 205 to ground, which turns on the amplifier 205. Alternatively, the motion circuit 201 includes a variable resistor as part of the resistor network. The variable resistor allows the motion circuit 201 to control the gain of the amplifier 205.

Figure 3:
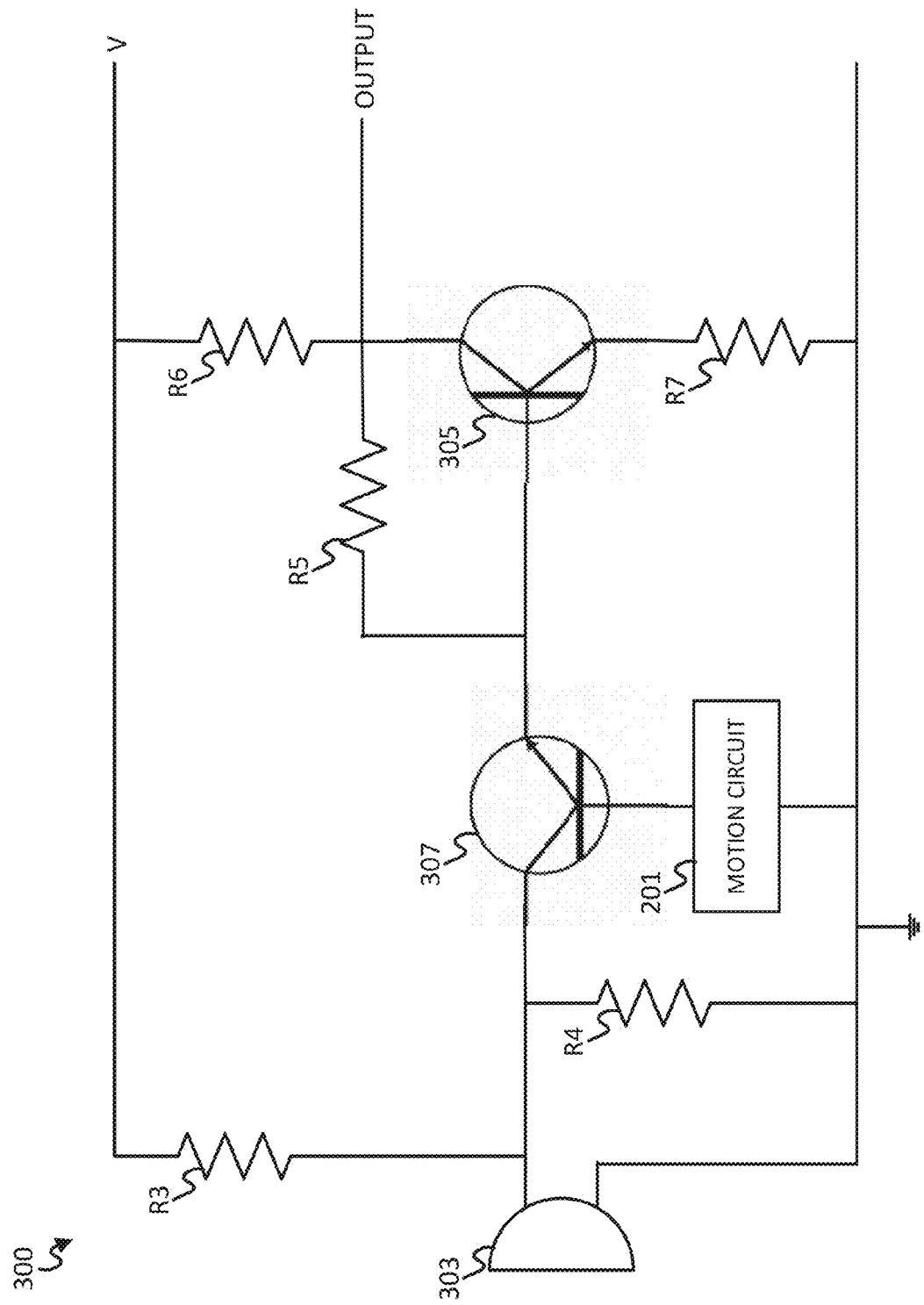
FIG. 3 illustrates another example circuit for kinetic event detection.

FIG. 3 illustrates another example circuit 300 for kinetic event detection. The circuit 300 includes the motion circuit portion 201 and an audio circuit portion including a microphone 303, a switching transistor 307, and an amplifying transistor 305. A first resistor network, including resistors R3, R4, and the motion circuit 201, controls the operation of the switching transistor 307. A second resistor network, including resistors R5, R6, and R7 controls the operation of the amplifying transistor 305.

The microphone 303 of the audio circuit portion is configured to convert sounds to an output signal. The motion circuit portion 201 includes a motion sensor configured to generate motion data based on movements of a device including the circuit 300 for kinetic event detection. The motion circuit portion 201 is configured to receive the motion data and modify the output signal based on a comparison of the motion data to a threshold.

The comparison may be binary. That is, the comparison may determine only whether the motion data exceeds the threshold, which may mean the velocity of the device including the circuit 300 is above a predetermined velocity or the acceleration of the device including the circuit 300 is above a predetermined acceleration. The adjustment to the output signal may be made the same without regard to the difference between the motion data and the threshold.

Alternatively, the adjustment to the output signal may be a function of the difference between the motion data and the threshold. For example, when the motion circuit is configured to reduce the amplitude of the output signal, the reduction may be by an amount proportional to a difference between the threshold and the motion data. As the speed or acceleration experienced by the motion sensor increases, the reduction in amplitude or volume of the output signal increases.

Figure 4:
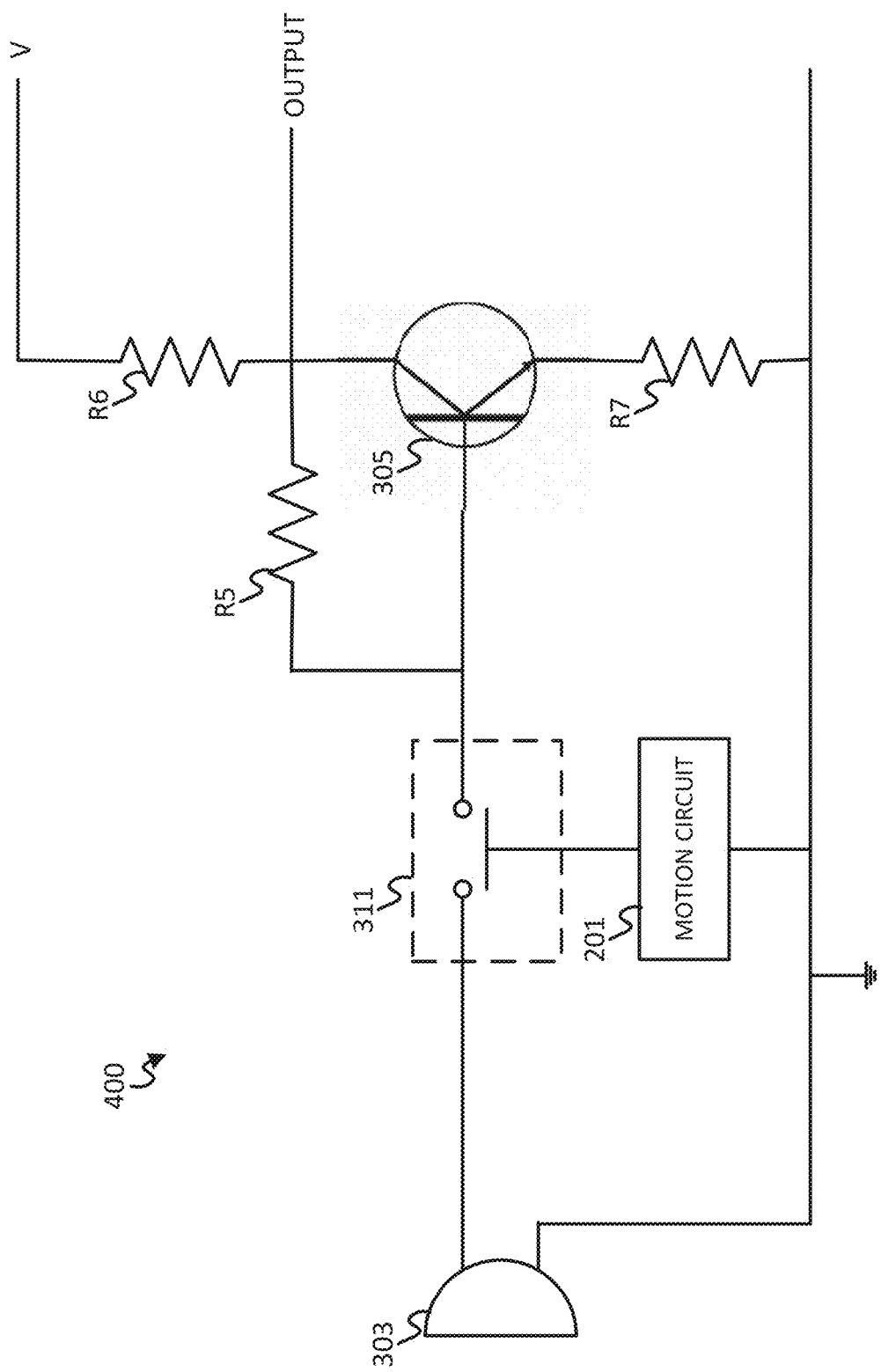
FIG. 4 illustrates another example circuit for kinetic event detection.

FIG. 4 illustrates another example audio circuit 400 for kinetic event detection. The audio circuit 400 includes a microphone 303, a transistor 305, a switch 311, and the motion circuit 201. The switch 311 may be a mechanical switch or a relay. The motion circuit 201 is configured to activate the switch 311 based on motion data from a motion sensor. The transistor 305 is configured to amplify the output of the microphone 303 according to a level determined by the resistors R5, R6, and R7. The switch 311 turns the transistor 305 on or off based on the movement detected by the motion sensor.

Figure 5:
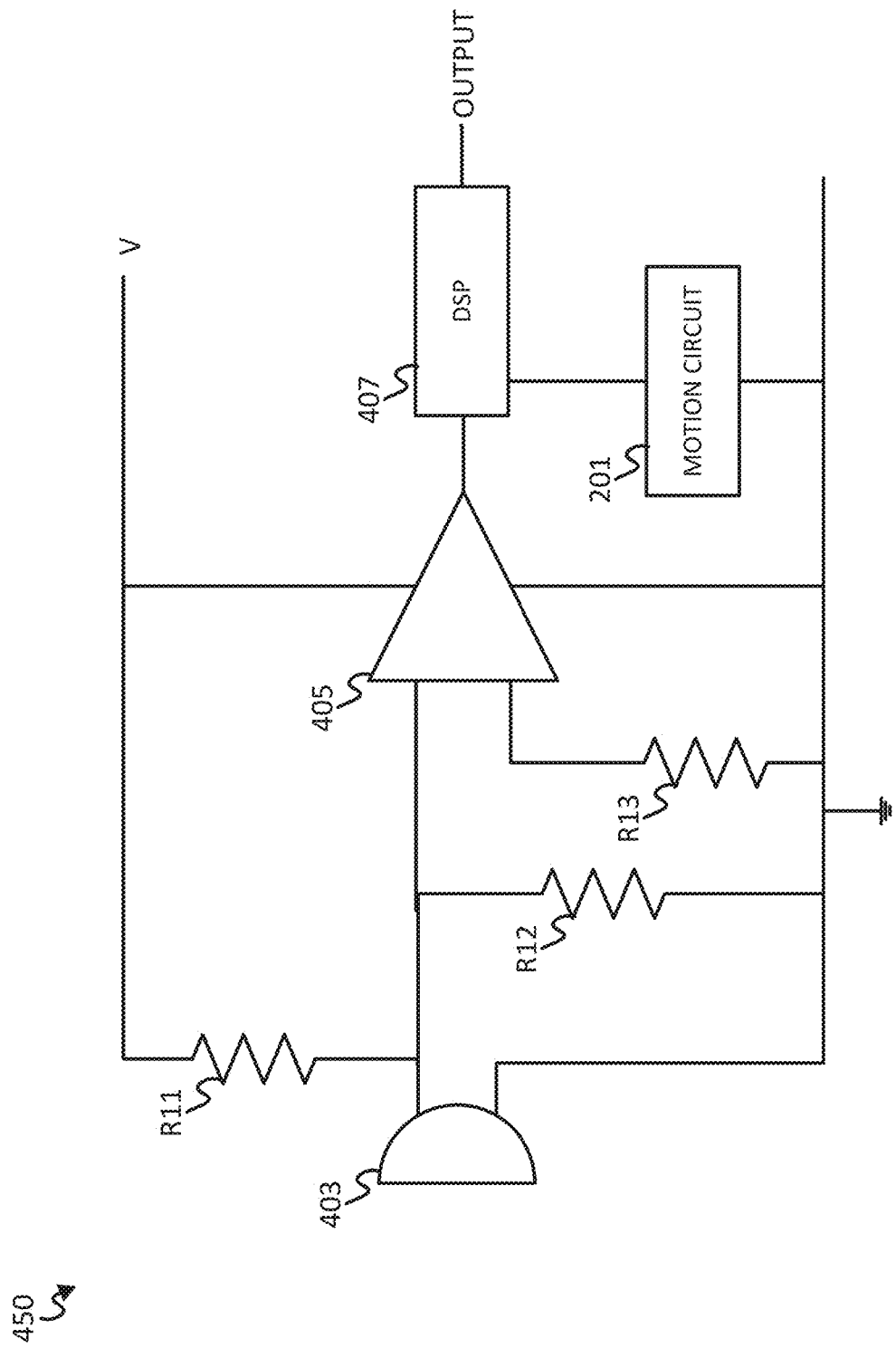
FIG. 5 illustrates yet another example circuit for kinetic event detection.

FIG. 5 illustrates another circuit 450 for kinetic event detection. The circuit 450 includes a microphone 403, an amplifier 405, a digital signal processor (DSP) 407, and the motion circuit 201. The gain of the amplifier 405 may be controlled by resistors R11, R12, and R13 to magnify the output signals of the microphone.

The DSP 407 is configured to process the output of the amplifier 405. The output of the amplifier may be an analog signal that is converted to a digital signal by an analog to digital converter (not shown). The DSP 407 is configured to analyze and process the digital signal according to the motion signal generated by the motion circuit 201. In one example, the DSP 407 filters specific types of sounds from the digital signal. The filtering may be done on a time basis or a frequency basis or a combination of time basis and frequency basis. The output of the DSP 407 may be converted back to an analog signal by a digital to analog converter.

Time basis filtering may be done in response to the motion signal received from the motion circuit 201. The motion signal may be an output of a motion sensor including velocity, speed, or acceleration data. The DSP 407 is configured to filter the digital signal (amplifier output) based on the motion signal. The DSP 407 may reduce the magnitude of the digital signal for a predetermined time period (e.g., 100 milliseconds, 300 milliseconds, 500 milliseconds, 1 second, or another value).

The DSP 407 may reduce the magnitude of the digital signal by a predetermined percentage (e.g., 10%, 20%, 50%, 100%, or another value). In one example, the predetermined percentage is a proportional to an amplitude of the motion signal, and in another example the predetermined percentage is between a lower bound (e.g., 10%) and an upper bound (e.g., 40%) and proportional to the amplitude of the motion signal.

Frequency based filtering involves selectively filtering specific frequency ranges from the digital signal. The specific frequency ranges may represent physical bumps of devices. One example frequency range is 20-50 hertz, and another example frequency range is 100 to 200 hertz. A filter based on discrete elements rather than a processor may be used.

Figure 6:
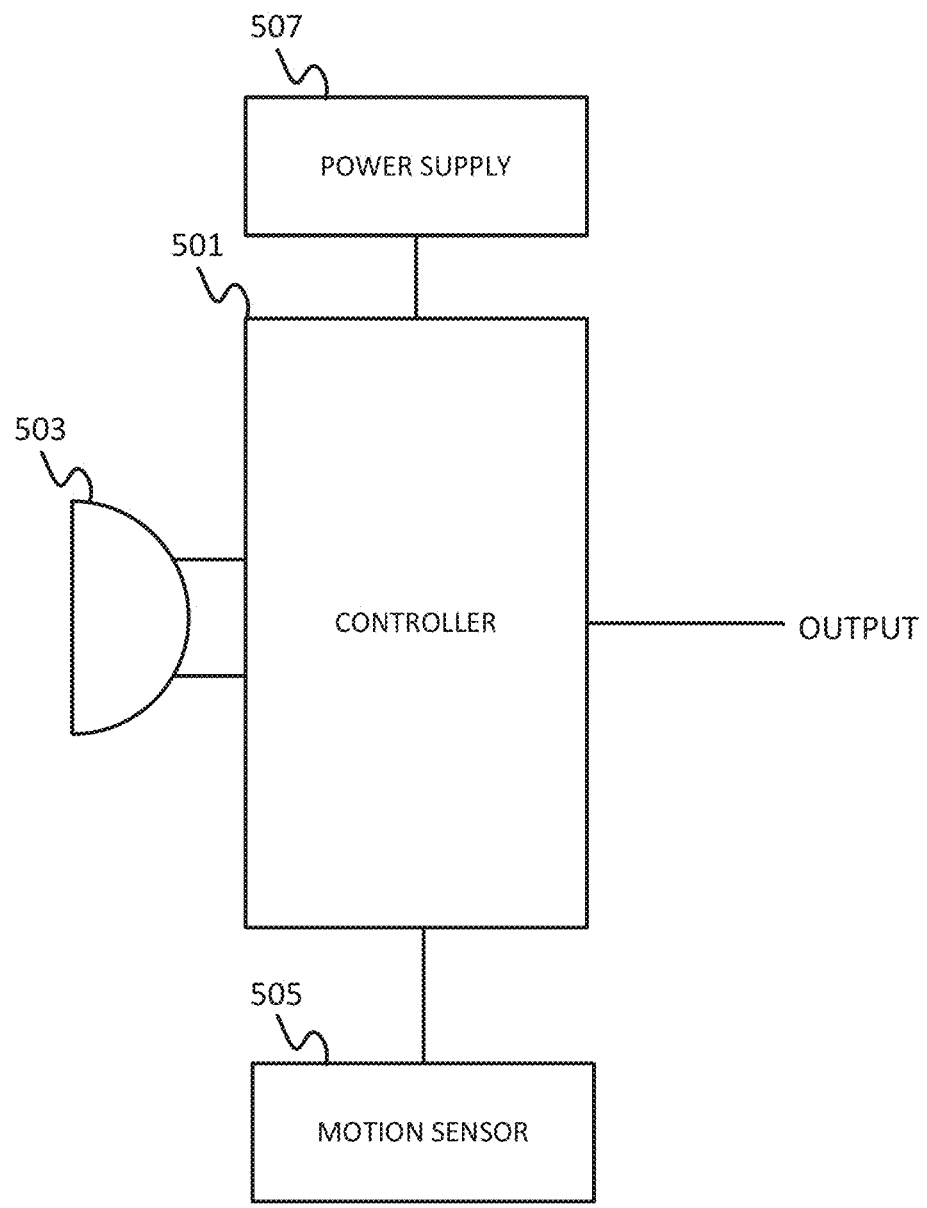
FIG. 6 illustrate a device for kinetic event detection.

FIG. 6 illustrate a device for kinetic event detection. The device includes a controller 501, a microphone 503, a motion sensor 505, and a power supply 507. The device may be a telephone, a headset, a laptop, an automobile, or any device including a microphone. The controller 501 may also be configured to generate data packets for voice communications from the electrical signal.

The microphone 503 generates an electrical signal based on sound waves in the environment of the microphone 503. The controller 501 is configured to receive the electrical signal from the microphone 503. The electrical signal may include multiple frequencies representing various sounds including voice communications, noise, and kinetic events. The device is physically coupled to the microphone 503 such that kinetic events experienced by the device are collected as unwanted sounds by the microphone 503.

The motion sensor 505 is configured to generate motion data based on movement of the device. The controller 501 is configured to perform a comparison of the motion data to a threshold level and perform an adjustment the electrical signal in response to the comparison of the motion data to a threshold acceleration level. The adjustment may include any combination of a reduction of the amplitude of the electrical signal, a removal of the electrical signal, or the removal or reduction of a frequency range from the electrical signal. The adjustment may occur for a predetermined time period after the motion data exceeds the threshold level or just during exceeding of the threshold level by the motion data. Adaptive time periods may be used.

The controller 501 may be configured to calculate a derivative with respect to time of the motion data. When the motion data is velocity, the derivative is acceleration data. When the motion data is acceleration data, the derivative is a third derivative of position, which may be referred to as jerk data. The controller 501 may be configured to compare the derivative with respect to time of the acceleration data to a jerk threshold and adjust the electrical signal when the derivative exceeds the jerk threshold. The adjustment may be any of the adjustment discussed above. The jerk threshold may be calculated to detect hanging up the handset of the telephone. Sudden quick movements are detected with the jerk threshold. Any combination of one or more types of motion detection may be used.

The controller 501 may also adjust the electrical signal according to multiple thresholds. For example, the controller 501 is configured to block the electrical signal when the motion data exceeds a blocking threshold and reduce the electrical signal when the motion data exceeds a reduction threshold. The blocking threshold is greater than the reduction threshold. The blocking threshold may represent an extreme noise disturbance such as dropping the telephone or slamming the handset. The blocking threshold may be based on the acceleration of gravity. For example, the blocking threshold may be equal to the acceleration of gravity or a predetermined fraction (e.g., ½, ¼, or ⅛) of the acceleration of gravity. The reduction threshold may represent softer noises that are still unwanted in voice communications, such as sliding the telephone across a table or otherwise moving the telephone. The reduction threshold may be a percentage (e.g., 20% or 50%) of the blocking threshold.

In some examples, the microphone 503 and the motion sensor 505 are not physically connected. The motion sensor 505 is mounted to detect motion of another device. The motion sensor 505 may be mounted to a telephone headset, a wireless microphone, or a telephone handset.

Similarly, the motion sensor 505 may be mounted or otherwise physically connected to a car door, a car trunk lid, or a car hood. When the door, hood, or trunk lid is shut, the motion sensor 505 detects the movement. The controller 501 is part of a telephone in the automobile. The controller 501 may communication with the motion sensor 505 in the car trunk lid, car door, or car hood using wireless communication (e.g., 802.11, radio communication, Bluetooth). The telephone may be integrated into the computer system of the automobile. When the car door, trunk lid, or car hood reaches a threshold level of movement, the telephone microphone volume is muted or otherwise reduced in volume to avoid the noise produced by the car door, trunk lid, or car hood. Alternatively, the motion sensor 505 may be mounted on an object that is not physically coupled to the microphone such as a door of a conference room including a telephone including the microphone. The motion sensor 505 may be mounted on a wall or door jamb near the door of the conference room. The objects that are physically coupled to the microphone or not physically coupled but near enough to create sounds audible by the microphone are collectively referred to as objects in the vicinity of the microphone.

The power supply 507 may be a power supply of a telephone. The power supply 507 may receive power from an Ethernet. The power supply 507 may be a battery. The device may include a light emitting diode (LED) indicator coupled to the battery to light when the battery power is getting low.

Figure 7:
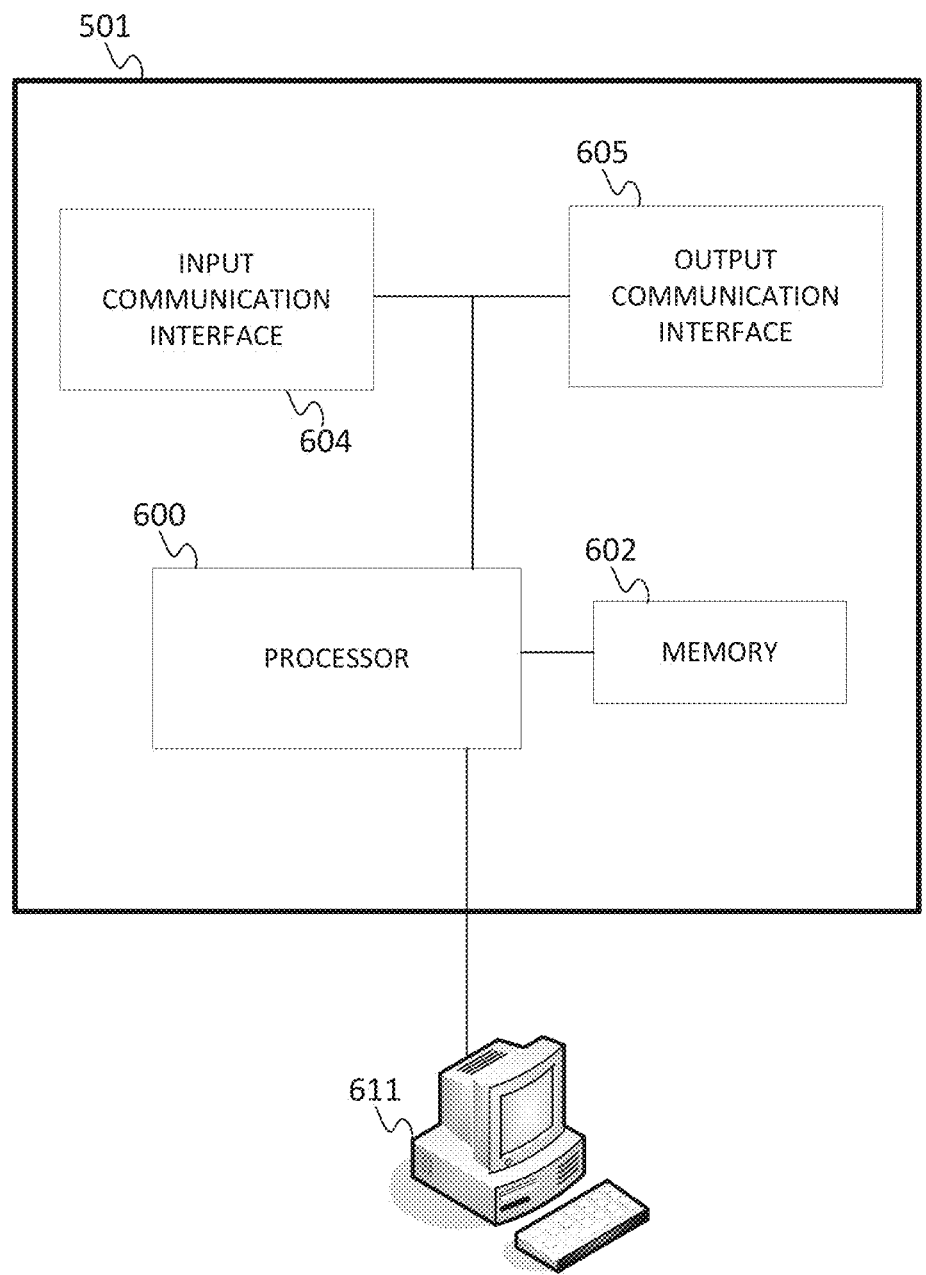
FIG. 7 illustrates an example controller of the device of FIG. 6.

FIG. 7 illustrates the controller 501 of FIG. 6. The controller 501 may include a memory 602, a processor 600, an input communication interface 604, and an output communication interface 605. In one example, a workstation 611 is coupled to the controller 503. Additional, different, or fewer components may be provided. Different devices may have the same or different arrangement of components.

Figure 8:
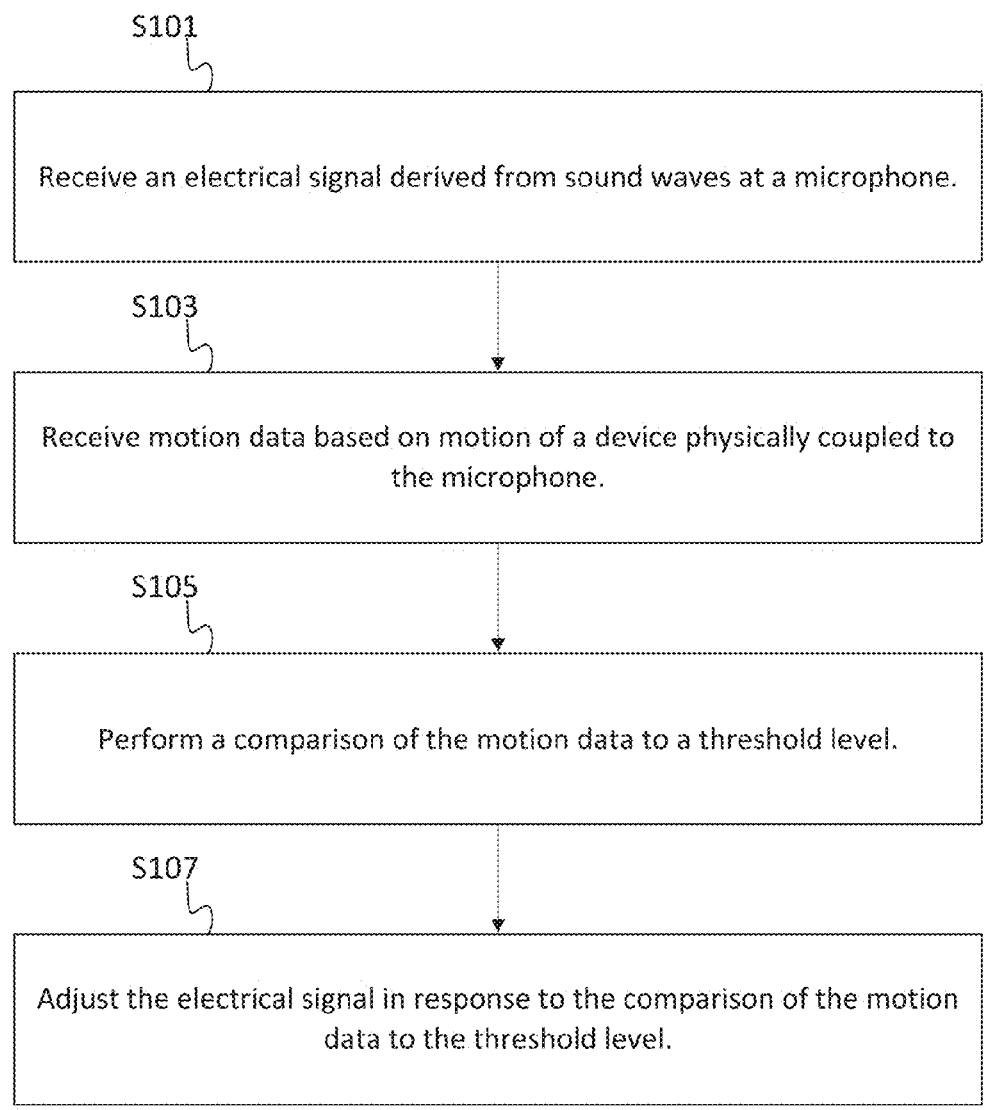
FIG. 8 illustrates an example flowchart for kinetic event detection.

FIG. 8 illustrates an example flowchart for detecting kinetic events. The acts in FIG. 8 may be performed by the network device 101 or another device. Additional, different, or fewer acts may be provided. The acts are performed in the order shown or other orders. The acts may also be repeated.

At act S101, the processor 600 is configured to receive an electrical signal derived from sound waves at a microphone. The electrical signal may have already been amplified or may be at low levels output from a transducer. The electrical signals may have multiple frequencies and include voice signals, background noise signals, and periodically kinetic event signals. The electrical signals may also include data or video signals.

At act S103, the processor 600 is configured to receive motion data based on movement of a device physically coupled to the microphone or of the microphone. In the case of a laptop, telephone, video camera or other audio/video equipment, the device and microphone are integrated. In the case of an automobile, the microphone and the device may be separated.

At act S105, the processor 600 is configured to perform a comparison of the motion data to a threshold level. In one example, the processor 600 calculates time based derivative of the motion data to generate differentiated data, which is compared to a threshold level. In another example, the processor 600 calculates a time based integral of the motion data to generate integrated data, which is compared to a threshold level. In addition or in the alternative, the processor 600 may be configured to calculate a time interval average of the motion data and compare the time interval average to a threshold level. Other calculations and/or comparisons may be used.

At act S107, the processor is configured to adjust the electrical signal in response to the comparison of the motion data to the threshold level. The adjustment may include removing the electrical signal from the output of the device. The adjustment may be a temporary decrease in amplitude of the output of the device. The adjustment may be a selective filtering of low or other frequencies from the output of the device.

Referring again to FIG. 7, the workstation 611 may include a memory and a processor. The workstation 611 may be configured to perform any of the calculations discussed above. The workstation 611 may receive user input to define configurable values for the thresholds, frequency ranges, and time periods in the above embodiments.

The processor 600 may include a general processor, digital signal processor, an application specific integrated circuit (ASIC), field programmable gate array (FPGA), analog circuit, digital circuit, combinations thereof, or other now known or later developed processor. The processor 600 may be a single device or combinations of devices, such as associated with a network, distributed processing, or cloud computing.

The memory 602 may be a volatile memory or a non-volatile memory. The memory 602 may include one or more of a read only memory (ROM), random access memory (RAM), a flash memory, an electronic erasable program read only memory (EEPROM), or other type of memory. The memory 602 may be removable, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

Any of the memories (e.g., memory 602, memory of workstation 611, or memory of the DSP 407) may be referred to as a non-transitory computer readable medium. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
converting sound to an output signal from a microphone of a telephone;
receiving acceleration data based on motion of the telephone and the microphone;
performing a comparison of the acceleration data to a threshold acceleration level; and
adjusting the output signal of the telephone in response to the comparison of the acceleration data to a threshold acceleration level, wherein adjusting includes reducing an amplitude of the output signal by an amount proportional to a difference between the threshold acceleration level and the acceleration data.

2. The method of claim 1, wherein adjusting the output signal comprises blocking the output signal.

3. The method of claim 1, wherein adjusting the output signal comprises filtering the output signal.

4. The method of claim 1, wherein adjusting the output signal comprises attenuating the output signal.

5. The method of claim 1, further comprising:
calculating a derivative with respect to time of the acceleration data;
comparing the derivative with respect to time of the acceleration data to a jerk threshold; and
switching off the output signal when the derivative with respect to time of the acceleration data exceeds the jerk threshold.

6. A telephone comprising:
a motion sensor configured to generate motion data based on movements of the telephone from a first position to a second position;
an audio circuit configured to convert sounds received by the telephone to an output signal; and
a motion circuit configured to receive the motion data and modify the output signal based on a comparison of the motion data to a threshold, wherein the motion circuit is further configured to reduce an amplitude of the output signal by an amount proportional to a difference between the threshold and the motion data.

7. The telephone of claim 6, further comprising:
a controller configured to generate data packets from the output signal.

8. The telephone of claim 6, wherein the motion circuit is configured to block the output signal.

9. The telephone of claim 6, wherein the motion circuit is configured to filter the output signal.

10. The telephone of claim 6, wherein the motion circuit is configured to calculate a derivative with respect to time of acceleration data as the motion data.

11. The telephone of claim 6, further comprising:
an amplifier circuit, physically coupled to the motion circuit, configured to amplify the output signal.

12. The telephone of claim 11, wherein the motion circuit is further configured to turn off the amplifier circuit when the motion data is above a threshold, or turn on the amplifier circuit by connecting the amplifier circuit to a ground when the motion data is below the threshold.

13. A non-transitory computer readable medium containing instructions that when executed are configured to:
receive an output signal from a microphone for a telephone handset;
receive motion data based on movement of the telephone handset physically coupled to the microphone;
filter the output signal based on vibrations of the telephone handset physically coupled to the microphone; and
perform an adjustment of the filtered output signal in response to the motion data, wherein the adjustment includes a reduction of an amplitude of the filtered output signal by an amount proportional to a difference between a threshold and the motion data.

14. The non-transitory computer readable medium of claim 13, wherein the adjustment includes a removal of the filtered output signal for a predetermined time period.

15. The non-transitory computer readable medium of claim 13, wherein the adjustment includes removal of a frequency range from the filtered output signal.

16. The non-transitory computer readable medium of claim 13, wherein the adjustment includes amplification of the output signal by an amplifier circuit physically coupled to the microphone.

17. The non-transitory computer readable medium of claim 16, wherein the adjustment includes turning off the amplifier circuit when the motion data is above the threshold, or turning on the amplifier circuit when the motion data is below the threshold.

* * * * *